(12) United States Patent
Johnson

(10) Patent No.: US 11,176,184 B2
(45) Date of Patent: Nov. 16, 2021

(54) INFORMATION RETRIEVAL

(71) Applicant: Encompass Corporation Pty Ltd, Sydney (AU)

(72) Inventor: Wayne Noel Johnson, Asquith (AU)

(73) Assignee: Encompass Corporation Pty Ltd, Sydney (AU)

(*) Notice: Subject to any disclaimer, the term of this patent is extended or adjusted under 35 U.S.C. 154(b) by 526 days.

(21) Appl. No.: 15/827,775

(22) Filed: Nov. 30, 2017

(65) Prior Publication Data
US 2018/0157738 A1    Jun. 7, 2018

(30) Foreign Application Priority Data
Dec. 2, 2016  (AU) .................... 2016904960

(51) Int. Cl.
| | | |
|---|---|---|
| *G06F 17/30* | (2006.01) | |
| *G06F 16/332* | (2019.01) | |
| *G06F 16/33* | (2019.01) | |
| *G06F 16/338* | (2019.01) | |

(Continued)

(52) U.S. Cl.
CPC .......... *G06F 16/332* (2019.01); *G06F 16/334* (2019.01); *G06F 16/338* (2019.01); *G06F 16/903* (2019.01); *G06F 40/186* (2020.01)

(58) Field of Classification Search
CPC .... G06F 16/332; G06F 16/334; G06F 16/338; G06F 16/903; G06F 40/186
See application file for complete search history.

(56) References Cited

U.S. PATENT DOCUMENTS

| | | |
|---|---|---|
| 6,714,936 B1 | 3/2004 | Nevin, III |
| 7,062,482 B1 | 6/2006 | Madan et al. |
| 7,565,627 B2 | 7/2009 | Brill et al. |

(Continued)

FOREIGN PATENT DOCUMENTS

| | | |
|---|---|---|
| AU | 2003/287030 A1 | 5/2004 |
| AU | 2013/201921 B2 | 10/2014 |

(Continued)

OTHER PUBLICATIONS

Encompass Corporation, "Overcoming the Hidden Costs of Information Management", Jul. 2013, available at <http://www.biia.com/wp-content/uploads/2013/07/Encompass-White-Paper_July-2013.pdf>, (17 pages).

(Continued)

*Primary Examiner* — Huawen A Peng

(57) ABSTRACT

A method of retrieving information relating to an entity, the method including, in at least one electronic processing device, performing a search by: determining a respective search template for the entity, the search template being indicative of a sequence of query instructions; performing a sequence of queries in accordance with the sequence of query instructions of the respective search template, each query being a query of a data source performed in accordance with a respective query instruction and being performed at least in part using at least one of: an identity of the respective entity; and, a result of a previous query performed in accordance with a previous query instruction in the sequence of query instructions; determining a result for at least some of the sequence of queries; and, determining information relating to the entity using the results.

15 Claims, 13 Drawing Sheets

(51) Int. Cl.
*G06F 16/903* (2019.01)
*G06F 40/186* (2020.01)

(56) References Cited

U.S. PATENT DOCUMENTS

| | | |
|---|---|---|
| 7,580,928 B2 | 8/2009 | Wu et al. |
| 7,672,950 B2 | 3/2010 | Eckardt, III et al. |
| 8,249,903 B2 | 8/2012 | Pendergraft et al. |
| 8,321,444 B2 | 11/2012 | Mowatt et al. |
| 8,600,577 B2* | 12/2013 | Bourque .......... G08G 1/096827 701/2 |
| 8,868,537 B1 | 10/2014 | Colgrove et al. |
| 2002/0004793 A1 | 1/2002 | Keith |
| 2002/0065739 A1 | 5/2002 | Florance et al. |
| 2002/0087686 A1 | 7/2002 | Cronk et al. |
| 2002/0169737 A1 | 11/2002 | Armstrong et al. |
| 2003/0046134 A1 | 3/2003 | Frolick et al. |
| 2004/0186750 A1 | 9/2004 | Surbey et al. |
| 2004/0215648 A1 | 10/2004 | Marshall et al. |
| 2004/0261013 A1 | 12/2004 | Wynn et al. |
| 2005/0086204 A1* | 4/2005 | Coiera .................. G06F 16/332 |
| 2005/0137899 A1 | 6/2005 | Davies et al. |
| 2006/0129896 A1 | 6/2006 | Rohn |
| 2007/0198600 A1 | 8/2007 | Betz |
| 2007/0214179 A1 | 9/2007 | Hoang |
| 2007/0266088 A1 | 11/2007 | Wu et al. |
| 2008/0086343 A1 | 4/2008 | Pendergraft et al. |
| 2008/0104408 A1 | 5/2008 | Mayer |
| 2008/0208854 A1 | 8/2008 | Badr et al. |
| 2008/0270458 A1 | 10/2008 | Gvelesiani |
| 2008/0301260 A1 | 12/2008 | Goldeen et al. |
| 2009/0006332 A1 | 1/2009 | Mowatt et al. |
| 2009/0037848 A1 | 2/2009 | Tewari et al. |
| 2009/0043584 A1 | 2/2009 | Philips |
| 2009/0150348 A1 | 6/2009 | Clarke |
| 2009/0157616 A1 | 6/2009 | Barber et al. |
| 2009/0164431 A1 | 6/2009 | Zivkovic et al. |
| 2009/0164912 A1 | 6/2009 | Barber et al. |
| 2010/0057713 A1 | 3/2010 | Gillam et al. |
| 2010/0100561 A1 | 4/2010 | Cooper et al. |
| 2010/0175055 A1 | 7/2010 | Wang et al. |
| 2011/0055231 A1 | 3/2011 | Huck et al. |
| 2011/0055755 A1 | 3/2011 | Chen et al. |
| 2011/0055768 A1 | 3/2011 | Chen et al. |
| 2011/0078188 A1 | 3/2011 | Li et al. |
| 2012/0023455 A1 | 1/2012 | Chen et al. |
| 2012/0143888 A1 | 6/2012 | Neelakantan et al. |
| 2012/0316903 A1 | 12/2012 | Pendergraft et al. |
| 2012/0317500 A1 | 12/2012 | Kosseifi et al. |
| 2012/0331134 A1 | 12/2012 | Lynn et al. |
| 2013/0246453 A1 | 9/2013 | Menten |
| 2013/0268533 A1 | 10/2013 | Komarov |
| 2014/0013000 A1 | 1/2014 | Vainer et al. |
| 2014/0229462 A1* | 8/2014 | Lo ..................... G06F 16/24575 707/707 |
| 2015/0081624 A1 | 3/2015 | Masse et al. |
| 2015/0088902 A1 | 3/2015 | Nilsson et al. |
| 2015/0095319 A1 | 4/2015 | Ormont et al. |
| 2015/0134633 A1* | 5/2015 | Colgrove .............. G06F 16/903 707/706 |
| 2016/0070708 A1 | 3/2016 | Labbi et al. |

FOREIGN PATENT DOCUMENTS

| | | |
|---|---|---|
| AU | 2014/203609 A1 | 1/2016 |
| EP | 2176792 | 4/2010 |
| GB | 2488373 A | 8/2012 |
| WO | WO 2004/040402 A2 | 5/2004 |
| WO | WO 2005/084285 A2 | 9/2005 |
| WO | WO 2009/006037 A1 | 1/2009 |

OTHER PUBLICATIONS

Historical versions of <http://www.theyrule.net> from 2001, 2004 and 2010, accessible via <http://archive.org> (75 pages).
Extended European Search Report dated Mar. 29, 2018, issued in European Application No. 17203911.7, 5 pages.

* cited by examiner

INFORMATION RETRIEVAL

CROSS-REFERENCE TO RELATED APPLICATION

This application claims priority to Australian Patent Application No. 2016904960, filed Dec. 2, 2016. This application is incorporated herein by reference in its entirety.

BACKGROUND OF THE INVENTION

The present invention relates to a method and apparatus for retrieving information relating to an entity and in one example to retrieving corporate data or the like from one or more data sources.

DESCRIPTION OF THE PRIOR ART

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

There are very many electronic data collections containing information about entities, such as companies, individuals, or the like. Typically such sources of data are a mixture of publically available and restricted access data repositories and including information regarding land ownership, association with corporate entities, police records, or the like. However, having the information provided across multiple different repositories makes identifying and accessing relevant information difficult, meaning pertinent information is often overlooked when performing searches relating to entities.

Whilst a number of existing solutions exist for facilitating retrieval of such data, given the complex nature of the data and data sources, current solutions tend to require manual oversight by a user. For example, retrieving information regarding one or more related entities typically requires searches of multiple repositories to be performed, with searches often being based on the outcome of previous searches. As a result, this process typically requires a user to perform a search, review the results, determine what further searches may be required, and then perform the further searches, with this process being repeated in an iterative fashion until the required information has been retrieved. Consequently this process can take tens of minutes in order to perform searches to thereby retrieve data regarding one or more entities, meaning that organisations can spend significant amounts of time performing searches particularly when information regarding multiple different entities is to be retrieved.

AU2013201921 describes a method of displaying information relating to one or more entities, the method including, in an electronic processing device, generating a network representation, the representation including a number of nodes, each node being indicative of a corresponding entity, and a number of connections between nodes, the connections being indicative of relationships between the entities. The method further includes causing the network representation to be displayed to a user, in response to user input commands, determining at least one user selected node corresponding to a user selected entity, determining at least one search to be performed in respective of the corresponding entity associated with the at least one user selected node, performing the at least one search to thereby determine additional information regarding the entity and causing any additional information to be presented to the user.

AU2014203609 describes a method of managing corporate data, the method including, in one or more electronic processing devices hosting a workspace associated with workspace corporate data, providing users access to the workspace in accordance with user access permissions to thereby allow the users to perform actions relating to the workspace corporate data, the actions including at least one of selecting workspace corporate data to be acquired from one or more corporate data sources, viewing the workspace corporate data, manipulating the workspace corporate data and updating the workspace corporate data.

SUMMARY OF THE PRESENT INVENTION

In one broad form the present invention seeks to provide a method of retrieving information relating to an entity, the method including, in at least one electronic processing device, performing a search by:
  a) determining a respective search template for the entity, the search template being indicative of a sequence of query instructions;
  b) performing a sequence of queries in accordance with the sequence of query instructions of the respective search template, each query being a query of a data source performed in accordance with a respective query instruction and being performed at least in part using at least one of:
     i) an identity of the respective entity; and,
     ii) a result of a previous query performed in accordance with a previous query instruction in the sequence of query instructions;
  c) determining a result for at least some of the sequence of queries; and,
  d) determining information relating to the entity using the results.

Typically at least one query is performed using a query parameter based on an attribute of the respective entity.

Typically the attribute is at least one of:
  a) an entity name;
  b) an entity address;
  c) an entity identifier; and,
  d) an entity date of birth/creation.

Typically the method includes performing searches for multiple different entities in parallel.

Typically each query instruction defines a data source and a respective report for the data source.

Typically the method includes performing at least some of the queries for a respective entity:
  a) in turn; and,
  b) in parallel.

Typically the method includes:
  a) performing a previous query in accordance with the sequence of query instructions;
  b) determining a result for the previous query; and,
  c) at least one of:
     i) selecting a next query to be performed from the sequence of query instructions at least partially in accordance with the result for the previous query; and,
     ii) performing a next query from the sequence of query instructions at least partially in accordance with the result for the previous query.

Typically the method includes:
a) determining a query parameter from the result for the previous query; and,
b) performing the query at least in part using the query parameter.

Typically the search template defines at least one operation and wherein the method includes selecting a next query to be performed at least partially in accordance with the at least one operation and the result for the previous query.

Typically the method includes:
a) determining a status for a number of searches; and,
b) displaying an indication of the status for the number of searches.

Typically the method includes, for each query:
a) determining if user intervention is required depending on a query response; and,
b) if user intervention is required:
  i) causing an intervention indication to be displayed to a user;
  ii) determining user input commands provided in response to the intervention indication; and,
  iii) performing the query at least partially in accordance with the user input commands.

Typically the method includes:
a) determining required query parameters in accordance with the query response;
b) generating the intervention indication at least partially in accordance with the required query parameters; and,
c) determining the required query parameters in accordance with the user input commands.

Typically the method includes transforming results from the query response into a summary list showing a list of potentially relevant entities allowing the user to select an entity from the summary list.

Typically the method includes:
a) retrieving a search schedule, the schedule defining:
  i) the plurality of entities; and,
  ii) the search template for each of the plurality of entities; and,
b) performing searches in accordance with the search schedule.

Typically the method includes determining a search template for an entity by selecting a search template in accordance with at least one of:
a) an available entity attribute of the entity;
b) an entity type of the entity; and,
c) required information regarding the entity.

Typically the method includes determining a search template for an entity by:
a) retrieving details of available templates from a template database;
b) displaying an indication of the available search templates; and,
c) determining a selection of a search template in accordance with user input commands.

Typically the method includes determining a search template by generating the search template in accordance with user input commands.

Typically the method includes generating a search template by:
a) determining a number of selected queries;
b) defining a sequence for execution of the number of selected queries; and,
c) generating a sequence of query instructions in accordance with the number of selected queries and the determined sequence.

Typically the method includes generating a search template by:
a) retrieving query instructions for each selected query; and,
b) generating the search template using the query instructions and the sequence.

Typically the method includes generating a search template by:
a) retrieving details of available queries from a query database;
b) displaying an indication of available queries; and,
c) determining selection of one or more of the available queries in accordance with user input commands.

Typically the method includes generating a search template by:
a) retrieving details of available data sources from a source database;
b) displaying an indication of one or more available data sources;
c) determining selection of a data source in accordance with user input commands; and,
d) displaying details of available queries at least partially in accordance with the selected data source.

Typically the method includes generating a search template by:
a) retrieving details of available reports for the selected data source from a report database;
b) displaying an indication of available reports;
c) determining selection of one or more of the available reports in accordance with user input commands; and,
d) displaying details of available queries at least partially in accordance with the selected report.

Typically the method includes generating a search template by:
a) determining at least one operation; and,
b) defining the sequence at least partially in accordance with the at least one operation.

Typically the method includes generating a search template by:
a) retrieving details of available operations from an operations database;
b) displaying an indication of one or more available operations; and,
c) identifying selection of one or more available operations in accordance with user input commands.

Typically the method includes generating a search template by:
a) displaying a template editor interface;
b) displaying an indication of available queries;
c) populating at least one query slot with a selected query in accordance with user input commands;
d) displaying at least one operation slot associated with at least one populated query slot;
e) displaying an indication of available operations;
f) populating the at least one operation slot with a selected operation in accordance with user input commands;
g) for each populated operation slot:
  i) displaying at least one query slot;
  ii) displaying an indication of available queries; and,
  iii) populating each query slot with a selected query in accordance with user input commands.

Typically the method includes:
a) generating a network representation, the representation including:
  i) a number of nodes, each node being indicative of a corresponding entity; and, ii) a number of connections between nodes, the connections being indicative of relationships between the entities; and, b) causing the network representation to be displayed to a user.

Typically the method includes generating the network representation by:
a) determining information regarding entities and their relationships; and,
b) executing a predetermined procedure for generating the network representation.

Typically the method includes:
a) obtaining results; and,
b) automatically extracting entities within the results allowing these to be used in generating the network representation.

Typically the method includes:
a) in response to user input commands, determining at least one manipulation of a network representation; and,
b) generating a manipulated network representation in accordance with user input commands.

Typically the method includes:
a) in response to user input commands, determining at least one user selected node corresponding to a user selected entity;
b) performing at least one search to thereby determine additional information regarding the entity; and,
c) causing any additional information to be presented to the user.

Typically the method includes determining the information by at least one of:
a) using data stored locally;
b) querying one or more remote data sources; and,
c) by searching disparate data sources.

Typically the method includes:
a) generating the network representation by using data stored locally; and,
b) updating the network representation by obtaining additional information by querying at least one of:
    i) one or more remote data sources; and,
    ii) one or more disparate data sources.

Typically the method includes:
a) storing results as local data in a database; and,
b) generating a network representation using the local data.

Typically the method includes generating a query string which is transformed into a valid query structure for a respective data source utilising a script associated with a selected report type for the respective data source.

Typically the method includes performing each query by passing a query to a search service to allow the search service to perform the query and return query results.

Typically the method includes generating a query using at least one of:
a) predefined rules; and,
b) a predefined script.

Typically the method includes:
a) parsing the results; and,
b) transforming the results into a predetermined format.

Typically the method includes:
a) receiving results data in the form of a PDF file;
b) parsing the file to identify text corresponding to different entities; and,
c) transforming the data to a mark-up file using the identified text.

Typically the method includes:
a) receiving the results as a mark-up file; and,
b) determining entity details in the mark-up file using the document definition.

Typically the method includes storing results as internal data in a mark-up file format.

In one broad form the present invention seeks to provide a system for retrieving information relating to an entity, the system including at least one electronic processing device that performs a search by:
a) determining a respective search template for the entity, the search template being indicative of a sequence of query instructions;
b) performing a sequence of queries in accordance with the sequence of query instructions of the respective search template, each query being a query of a data source performed in accordance with a respective query instruction and being performed at least in part using at least one of:
    i) an identity of the respective entity; and,
    ii) a result of a previous query performed in accordance with a previous query instruction in the sequence of query instructions;
c) determining a result for at least some of the sequence of queries; and,
d) determining information relating to the entity using the results.

In one broad form the present invention seeks to provide a method of generating a search template for use in retrieving information relating to an entity, the method including in at least one electronic processing device:
a) determining a number of selected queries;
b) defining a sequence for execution of the number of selected queries; and,
c) generating a sequence of query instructions in accordance with the number of selected queries and the determined sequence.

Typically the method includes generating a search template by:
a) retrieving query instructions for each selected query; and,
b) generating the search template using the query instructions and the sequence.

Typically the method includes generating a search template by:
a) retrieving details of available queries from a query database;
b) displaying an indication of available queries; and,
c) determining selection of one or more of the available queries in accordance with user input commands.

Typically the method includes generating a search template by:
a) retrieving details of available data sources from a source database;
b) displaying an indication of one or more available data sources;
c) determining selection of a data source in accordance with user input commands; and,
d) displaying details of available queries at least partially in accordance with the selected data source.

Typically the method includes generating a search template by:
a) retrieving details of available reports for the selected data source from a report database;
b) displaying an indication of available reports;
c) determining selection of one or more of the available reports in accordance with user input commands; and, d) displaying details of available queries at least partially in accordance with the selected report.

Typically the method includes generating a search template by:
  a) determining at least one operation; and,
  b) defining the sequence at least partially in accordance with the at least one operation.

Typically the method includes generating a search template by:
  a) retrieving details of available operations from an operations database;
  b) displaying an indication of one or more available operations; and,
  c) identifying selection of one or more available operations in accordance with user input commands.

Typically the method includes generating a search template by:
  a) displaying a template editor interface;
  b) displaying an indication of available queries;
  c) populating at least one query slot with a selected query in accordance with user input commands;
  d) displaying at least one operation slot associated with at least one populated query slot;
  e) displaying an indication of available operations;
  f) populating the at least one operation slot with a selected operation in accordance with user input commands;
  g) for each populated operation slot:
    i) displaying at least one query slot;
    ii) displaying an indication of available queries; and,
    iii) populating each query slot with a selected query in accordance with user input commands.

In one broad form the present invention seeks to provide a system for generating a search template for use in retrieving information relating to an entity, the system including at least one electronic processing device that:
  a) determines a number of selected queries;
  b) defines a sequence for execution of the number of selected queries; and,
  c) generates a sequence of query instructions in accordance with the number of selected queries and the determined sequence.

It will be appreciated that the broad forms of the invention and their respective features can be used in conjunction, interchangeably and/or independently, and reference to separate broad forms is not intended to be limiting.

BRIEF DESCRIPTION OF THE DRAWINGS

An example of the present invention will now be described with reference to the accompanying drawings, in which: —

DETAILED DESCRIPTION OF THE PREFERRED EMBODIMENTS

Figure 1:
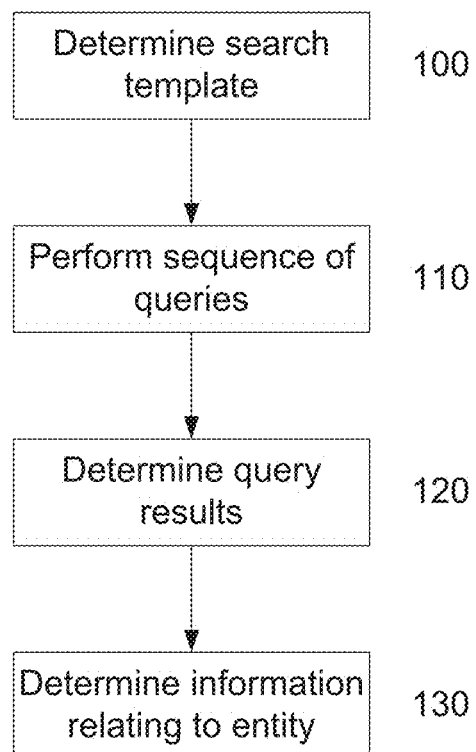
FIG. 1 is a flow chart of an example of a method of retrieving information relating to an entity.

An example of a method of retrieving information relating to an entity will now be described with reference to FIG. 1.

For the purpose of illustration, it is assumed that the process is performed at least in part using one or more electronic processing devices forming part of one or more processing systems, such as servers, personal computers or the like, and which may optionally be connected to one or more other processing systems, data sources or the like, via a network architecture, as will be described in more detail below.

In this example, at step 100 the one or more processing devices determine a respective search template for the entity. The search template defines a sequence of queries that can be performed in order to retrieve information relating to the respective entity. The search template can be of any appropriate form but is typically in the form of a sequence of query instructions, optionally with operations defining when the respective instructions should be executed. The search template can be determined in any of a number of ways and this could include retrieving the search template from a database, specifying the search template to be used through manual and/or automated processes, or the like.

At step 110 a sequence of queries are performed in accordance with the sequence of query instructions in the respective search template. Each query is typically a query of a data source, which may be located remotely to or locally to the one or more electronic processing devices. The query of each data source is performed in accordance with a respective query instruction, with the query instructions typically defining how the data source is to be queried and any required information in order to allow this to be achieved. For example, the query instructions can define any required search parameters and could include or provide access to a script or rules defining a search query for analysis and interpretation by the respective data source. The query is typically performed using a query parameter relating to an attribute of the entity, such as an identity of the entity, or other related information, for example obtained as a result of a previous query.

At step 120 the one or more processing devices determine a result for at least some of the sequence of queries, using this to determine information relating to the entity at step 130. The information can be of any appropriate form, but in one example, includes one or more reports obtained from the data source(s), and/or information derived therefrom, such as information regarding the entity and relationships to other entities.

The entities and relationships may be of any appropriate form, depending on the preferred implementation. In one example, the system is used to provide business intelligence information, in which case the entities are typically individuals, corporations, businesses, trusts, or any other party involved in a business or other commercial environment. Additionally, entities may also represent attributes of other entities, so for example, an address of a business could be presented as an entity that is related to the business. In general the relationship will represent some form of connection between the entities, such as ownership, involvement in transactions, or the like.

It would be appreciated that the above described process therefore utilises a template to define a sequence of queries that are performed relating to a respective entity. By allowing templates to be defined which include different sequences of queries this allows a wide range of information to be retrieved for different types of entities. Furthermore, as this substantially automates the searching process, this in turn allows the processing system to perform multiple searches relating to different entities substantially in parallel. Accordingly, by repeating steps 100 to 130 for multiple entities at the same time, this allows information regarding a plurality of different entities to be retrieved rapidly and with minimal manual intervention. This allows a single user to oversee searches relating to multiple entities, and perform these more rapidly than has been possible using traditional approaches.

Additionally, as each individual search is not particular computationally expensive, this allows tens or hundreds of searches to be performed in parallel using limited processing capabilities, thereby allowing a large amount of information to be retrieved rapidly but without requiring a complex infrastructure.

A number of further features will now be described.

In one example, at least one query is performed using a query parameter based on an attribute of the respective entity. The attribute can be any information regarding or related to the entity, but in one example is at least one of an entity name, an entity address, an entity identifier and an entity date of birth/creation. It will be appreciated from this that each time the template is used in a search, respective query parameters can be determined relating to the entity currently being searched, thereby allowing the template to return information relating to the respective entity. However, other mechanisms for tailoring a template in order to perform a search for a respective entity could be used and reference to a query parameter based on an entity attribute is not intended to be limiting.

In one example, each query instruction defines a data source and a respective report for the data source. This information can then be used to retrieve a relevant script allowing the query to be performed. Thus, a number of standard scripts for retrieving reports from different data sources can be stored in a repository, such as a script database, and then retrieved as required, based on the data source and report defined in the respective query instruction.

In one example, the method includes performing at least some of the queries for a respective entity in turn or in parallel. Thus, when performing a search relating to a respective entity, some queries can be performed in parallel if these are independent. However, in some cases, subsequent queries will be dependent on the outcome of previous queries, in which case queries can be performed in turn, in accordance with the sequence of query instructions. Thus, the sequence of query instructions will typically specify not only which queries are to be performed, but also the order in which this is to occur.

When queries are performed in turn, the method typically includes performing a previous query in accordance with the sequence of query instructions and determining a result for the previous query. Once the results are received, these can then be used either to select a next query to be performed, or to allow a next query to be performed at least partially in accordance with the result for the previous query. In one particular example, this process involves determining a query parameter from the result for the previous query, for example by parsing the result to identify particular information, such as an entity attribute of the entity or a related entity, and performing the query at least in part using the query parameter. For example, a search could be performed to identify subsidiary companies related to the entity, with the names of the subsidiary companies being extracted from the results and used to perform further searches.

To increase the flexibility of the sequence of query instructions, in one example, the search template defines at least one operation with the method including selecting a next query to be performed at least partially in accordance with the at least one operation and result for the previous query. The nature of the operation can vary depending upon the implementation but could include a conditional requirement, such as a logic statement, so that a subsequent query is performed conditionally depending upon the outcome of a previous query. For example, if a previous query identifies that an entity is related to another entity, such as a subsidiary company, then a further query can be performed in respect of the subsidiary company. Alternatively, if a parent company is identified, then a different further query can be performed in respect of the parent company. It will be appreciated from this that provision of appropriate operations allows complex decision making behaviour to be embodied within the templates, thereby allowing typically manual execution of searches to be largely automated.

The method typically includes determining a status for a number of searches and displaying an indication of the status of each of the number of searches. In this regard, the status can provide information regarding the execution of individual queries, such as whether queries have been performed successfully or not. This can be used to display real time feedback to a user, allowing the user to track the completion of searches and intervene if required.

In one example, this is achieved by having the processing device determine if intervention is required depending on a query response provided by the data source in response to the query. If intervention is required, the processing device can cause an intervention indication to be displayed to the user, determine user input commands provided in response to the intervention indication and then performing the query at least partially in accordance with the user input commands.

In one particular example this involves determining required query parameters in accordance with the query response, generating the intervention indication at least partially in accordance with the required query parameters and determining the required query parameters in accordance with user input commands. For example, if a query is being performed in respect of a named entity, a data source may return a list of possible entities corresponding to a specified entity name. In this instance the user may be required to select a particular one or more of the listed entities in order to allow the query to be completed. It will be appreciated however that other query parameters could be specified and reference to an entity name is not intended to be limiting.

In one example, the searches are performed on the basis of a search schedule. In particular, the search schedule can define a plurality of entities for which searches are to be performed, and the search template associated with each of the plurality of entities. In this instance, searches can be performed by having the processing device retrieve a search schedule and then perform the searches in accordance with the search schedule. This enables searches of multiple entities to be initiated easily, and further allows the searches to be repeatedly performed automatically for example on a periodic basis, such as daily, weekly, monthly, or the like, depending on the requirements of a user.

Whilst templates can be created on a case by case basis, more typically a number of templates are defined, with these being reused as required, in order to allow set searches to be performed for different entities. In this case, predefined templates can be stored in a repository such as a template database, and then retrieved for use as required.

The different templates are typically configured for use in a particular situation, for example to perform a particular combination of queries in order to retrieve specific types of information relating to a respective entity. It is therefore important to ensure that a selected template is appropriate for the particular circumstances. Accordingly, in one example templates can be selected based on a number of factors, including but not limited to an available attribute of the entity, an entity type and/or the information to be retrieved regarding the entity. Thus, it will be appreciated that different searches will typically be performed for different types of entity, such as companies, partnerships, individuals or the like, and that a different template may be selected depending on what information is known regarding the entity, such as if a company name is known as opposed to an identifier such as an ABN/ACN. Similarly, the search performed and hence the template used will vary depending on the information that is to be retrieved, such as whether the search is to identify related companies, individuals involved in running a company, or the like.

Accordingly, in one example, the method includes determining an entity type of the entity to which the search relates, and then selecting a search template in accordance with the entity type. Similarly, the method could include determining the required information associated with an entity to be identified by the search and then selecting the search template in accordance with the required information. This allows pre-defined search templates to be selected based on an entity type and/or any information required regarding the entity.

In one particular example, the method includes having the processing device display a list of available search templates and then determine a selection of a search template in accordance with user input commands. Thus, the processing device can display available templates by retrieving details of available templates from a template database optionally based on the entity attributes, entity type or information required regarding the entity, with the user then being able to select a desired template from the list.

Additionally and/or alternatively, the method can include generating a search template. This can be performed in order to create the templates that are stored in the template database, or to create a custom template allowing a particular search to be performed.

Templates can be created in any one of a number of manners but in one broad form involves having the processing device determine a number of queries, define a sequence for execution of the selected queries and then generating a sequence of query instructions in accordance with the number of queries and the determined sequence. The queries and sequence can be determined manually in accordance with user input commands or automatically depending on the preferred implementation.

In one example, the queries, and in particular the query instructions, are pre-defined and stored in a query database. The queries will typically be generated by creating scripts or other rules based on knowledge of the data source and the available reports. In particular the scripts are created to mimic the user interactions that would normally be involved in interacting with the data source in order to perform a query to retrieve relevant information. Such scripts can be manually written, or can be based on recorded user interactions, as will be appreciated by persons skilled in the art. The creation of such scripts is known in the art and will not therefore be described in any further detail.

In this case, the process typically includes retrieving details of available queries from the query database, displaying an indication of the available queries and then determining selection of one or more of the available queries in accordance with user input commands.

The queries are typically specific to a particular data source. Accordingly, in one example the details of the available queries are retrieved based on knowledge of the data source that is to be queried. In this case, details of available data sources can be retrieved from a source database, which is a database including information regarding the different available data sources. An indication of the available data sources can then be displayed, allowing a selected data source to be identified in accordance with user input commands. Following this, details of available queries associated with the respective data source can then be retrieved and displayed to the user as previously described.

A similar process can be performed on the basis of reports. In this case, details of available reports for the selected data source are retrieved from a report database, which may be the same as the source database. An indication of available reports can then be displayed, allowing one or more of the available reports to be selected in accordance with user input commands, with this being used to display details of available queries.

Thus, it will be appreciated that the above process allows a user to simply specify a data source that is to be queried, and in one example a report that is to be requested. Details of queries defined for that data source and/or report can then be retrieved, allowing an appropriate query to be selected for use in the template, thereby making the process simple to use.

In addition to including queries, the templates can also include operations, such as logical statements that can be used to control execution of further queries. In this example, the method typically includes generating a search template by determining at least one operation and defining the sequence at least partially in accordance with the at least one operation. Again, this can be achieved in any suitable manner but typically involves having the processing device retrieve details of available operations from an operations database, display an indication of these and allow a user to select one of the available operations in accordance with user input commands.

It will be appreciated that once queries and operations have been selected these can be arranged in a desired order to thereby define the sequence of query instructions. In this regard, the instructions typically specify the query and/or operation to be performed, and in particular allow any relevant script to be retrieved and executed as required. The queries can be arranged hierarchically, with queries in a common hierarchy layer performed concurrently, and queries in subsequent hierarchy layers being performed subsequently.

In one particular example, this process is facilitated by displaying a graphical template editor interface that allows queries and operations to be selected and arranged. In one example, this interface displays an indication of available queries, allowing at least one query slot to be populated with a selected query in accordance with user input commands. Following this at least one operation slot can be associated with the populated query, with available operations being displayed to the user so that the operation slot can be populated with the selected operation in accordance with user input commands. For each populated operation slot a further query slot is displayed allowing this to be populated using mechanisms described above.

Thus, it will be appreciated that the above described process allows a user to progressively build templates, by selecting previously defined queries based on data sources and/or reports of interest. The queries can be ordered and combined with respective operations using a graphical user interface, allowing complex query processes to be constructed without requiring any programming knowledge by the user.

For the purpose of the above description, it should be noted that a query could itself be a previously defined template, so that multiple templates can be effectively nested to thereby reduce the burden involved in creating new templates, and to further increase the relative complexity of the searches that can be performed using the templates.

In one example the retrieved information is used to generate a network representation including a number of nodes, with each node being indicative of a respective entity and a number of connections between the nodes the connections being indicative of relationships between the entities. Once generated the network representation can be displayed to a user allowing the user to more easily view the results data in an intuitive manner.

The network representation can be generated in any appropriate manner. In one example this involves determining information regarding entities and their relationships, for example by extracting these from results, and then executing a pre-determined procedure for generating the network representation. Once generated, the network representation can be manipulated in accordance with user input commands.

Additionally the network representation can be used to allow searches to be performed based on a user selected node corresponding to a user selected entity. Thus, an entity can be selected by selecting a node in the network representation and then performing a search relating to the selected entity. This can be used to generate additional information regarding the entity which can then be displayed to the user. In one particular example, users can select an entity by selecting a node in the representation. The processing device can then determine templates applicable to the selected entity and then display these, allowing the user to select a relevant template for the search, with the search being subsequently performed using the selected template. Thus, this allows the user to initiate complex searches from the network representation, simply by selecting a template that is relevant to the currently selected entity. Additionally and/or alternatively, the user can elect to add the selected entity to a schedule so that the entity is included in subsequent scheduled searches.

The searches can be performed on data stored locally or by querying one or more remote data sources. Additionally, the information can be determined by searching disparate data sources, so for example different queries within the template may be used to retrieve information from respective data sources. In one particular example, an initial network representation can be generated using data stored locally with the network representation subsequently being updated by obtaining additional information by querying one or more remote data sources. However, this is not essential the network representation can be generated using information received from any data source.

In one example, each query operates by generating a search string which is transformed into a valid query structure for a respective data source utilising a script associated with a selected report type for the respective data source. The search query can then be passed to a search service to allow the search service to perform the search and return the search results. It will be appreciated however that any suitable querying mechanism can be used, depending for example on the nature of the data source.

In one example, the method includes parsing results and transforming the results into a pre-determined format. For example, results can be received in the form of search results data, in the form of a PDF file which can then be parsed to identify text corresponding to different entities, with the data being transferred to a mark-up language file, such as an XML file, using the identified text. Alternatively, such results can be received as a mark-up file with entity details being identified in the mark-up file using a document definition. Results can be stored as internal data in a mark-up language format.

Figure 2:
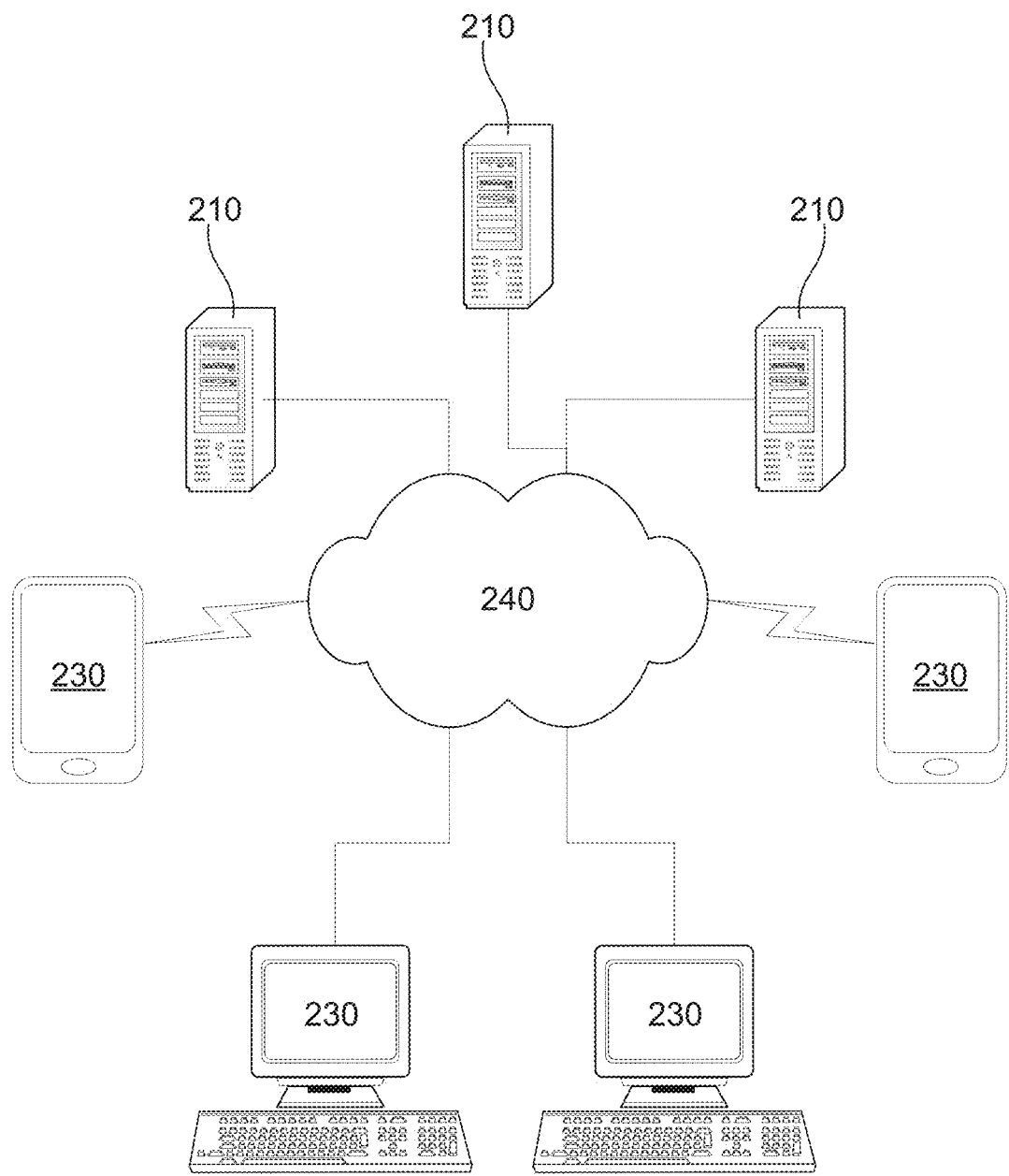
FIG. 2 is a schematic diagram of an example of a distributed computer architecture.

As mentioned above, in one example, the process is performed by one or more processing systems operating as part of a distributed architecture, an example of which will now be described with reference to FIG. 2.

In this example, a number of processing systems 210 are provided coupled to one or more computer systems 230, via one or more communications networks 240, such as the Internet, and/or a number of local area networks (LANs).

Any number of processing systems 210 and computer systems 230 could be provided, and the current representation is for the purpose of illustration only. The configuration of the networks 240 is also for the purpose of example only, and in practice the processing systems 210 and computer systems 230 can communicate via any appropriate mechanism, such as via wired or wireless connections, including, but not limited to mobile networks, private networks, such as an 802.11 networks, the Internet, LANs, WANs, or the like, as well as via direct or point-to-point connections, such as Bluetooth, or the like.

In this example, the processing systems 210 are adapted to provide access to data allowing this to be displayed via the computer systems 230. Whilst the processing systems 210 are shown as single entities, it will be appreciated they could include a number of processing systems distributed over a number of geographically separate locations, for example as part of a cloud based environment. Thus, the above described arrangements are not essential and other suitable configurations could be used.

Figure 3:
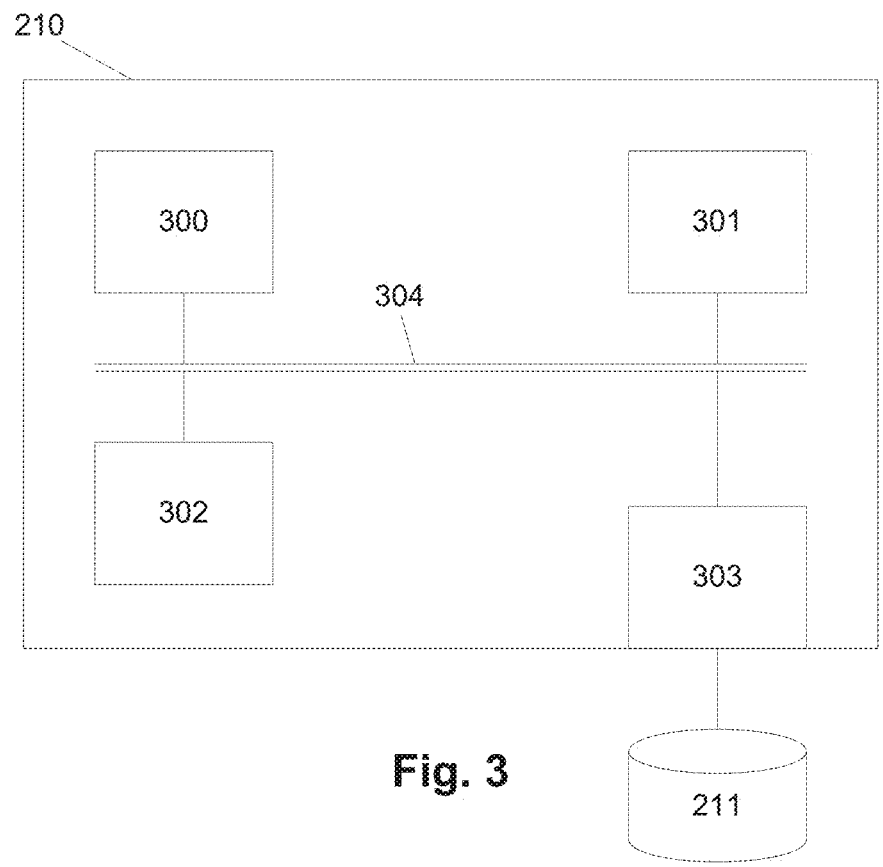
FIG. 3 is a schematic diagram of an example of a processing system of FIG. 2.

An example of a suitable processing system 210 is shown in FIG. 3. In this example, the processing system 210 includes at least one microprocessor 300, a memory 301, an optional input/output device 302, such as a keyboard and/or display, and an external interface 303, interconnected via a bus 304 as shown. In this example the external interface 303 can be utilised for connecting the processing system 210 to peripheral devices, such as the communications networks 230, databases 211, other storage devices, or the like. Although a single external interface 303 is shown, this is for the purpose of example only, and in practice multiple interfaces using various methods (eg. Ethernet, serial, USB, wireless or the like) may be provided.

In use, the microprocessor 300 executes instructions in the form of applications software stored in the memory 301 to allow the required processes to be performed. The applications software may include one or more software modules, and may be executed in a suitable execution environment, such as an operating system environment, or the like.

Accordingly, it will be appreciated that the processing system 210 may be formed from any suitable processing system, such as a suitably programmed PC, web server, network server, or the like. In one particular example, the processing system 210 is a standard processing system such as an Intel Architecture based processing system, which executes software applications stored on non-volatile (e.g., hard disk) storage, although this is not essential. However, it will also be understood that the processing system could be any electronic processing device such as a microprocessor, microchip processor, logic gate configuration, firmware optionally associated with implementing logic such as an FPGA (Field Programmable Gate Array), or any other electronic device, system or arrangement.

Figure 4:
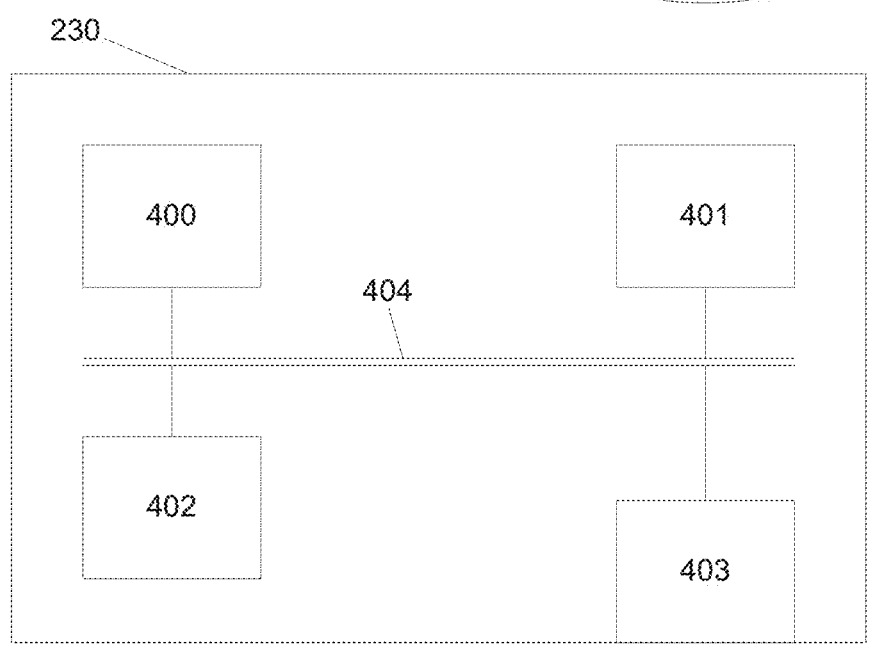
FIG. 4 is a schematic diagram of an example of a computer system of FIG. 2.

As shown in FIG. 4, in one example, the computer system 230 includes at least one microprocessor 400, a memory 401, an input/output device 402, such as a keyboard and/or display, an external interface 403, and typically a card reader 404, interconnected via a bus 405 as shown. In this example the external interface 403 can be utilised for connecting the transaction terminal 220 to peripheral devices, such as the communications networks 230 databases, other storage devices, or the like. Although a single external interface 403 is shown, this is for the purpose of example only, and in practice multiple interfaces using various methods (eg. Ethernet, serial, USB, wireless or the like) may be provided. The card reader 404 can be of any suitable form and could include a magnetic card reader, or contactless reader for reading smartcards, or the like.

In use, the microprocessor 400 executes instructions in the form of applications software stored in the memory 401, and to allow communication with one of the processing systems 210.

Accordingly, it will be appreciated that the computer system 230 be formed from any suitably programmed processing system and could include suitably programmed PCs, Internet terminal, lap-top, or hand-held PC, a tablet, a smart phone, or the like. However, it will also be understood that the computer system 230 can be any electronic processing device such as a microprocessor, microchip processor, logic gate configuration, firmware optionally associated with implementing logic such as an FPGA (Field Programmable Gate Array), or any other electronic device, system or arrangement.

Examples of the processes for retrieving information will now be described in further detail. For the purpose of these examples it is assumed that one or more respective processing systems 210 are servers. In one example, the servers 210 could host searching services that are accessed by the computer systems 230 allowing the searching to be performed, although alternatively this could be performed by the computer system 230. Different servers 210 also typically act as data sources by hosting data services that can be accessed by the computer system 230, for example via a suitable user interface, such as a browser application. The servers 210 typically execute processing device software, allowing relevant actions to be performed, with actions performed by the server 210 being performed by the processor 300 in accordance with instructions stored as applications software in the memory 301 and/or input commands received from a user via the I/O device 302. It will also be assumed that actions performed by the computer systems 230, are performed by the processor 400 in accordance with instructions stored as applications software in the memory 401 and/or input commands received from a user via the I/O device 402.

However, it will be appreciated that the above described configuration assumed for the purpose of the following examples is not essential, and numerous other configurations may be used. It will also be appreciated that the partitioning of functionality between the different processing systems may vary, depending on the particular implementation.

Figure 5A:
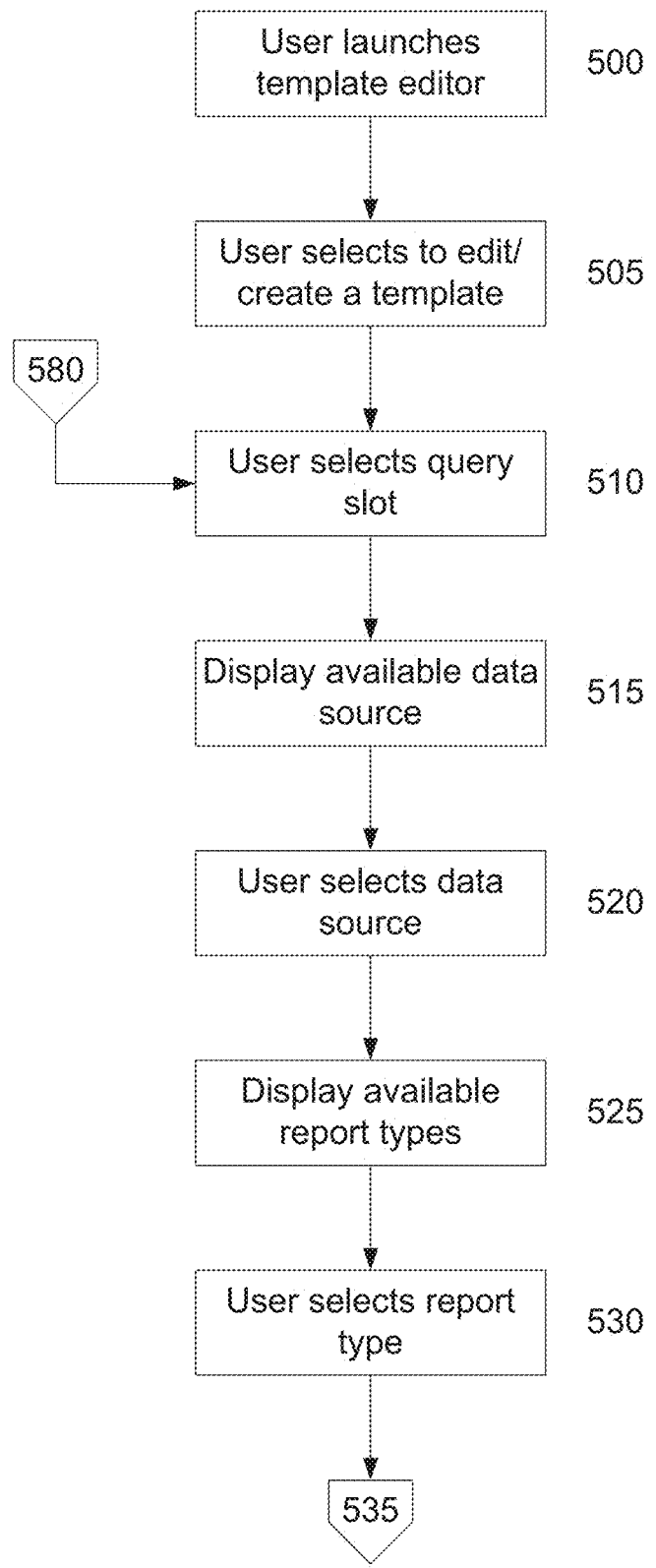
FIG. 5A and FIG. 5B are a flow chart of an example of a process for creating a template.
Figure 5B:
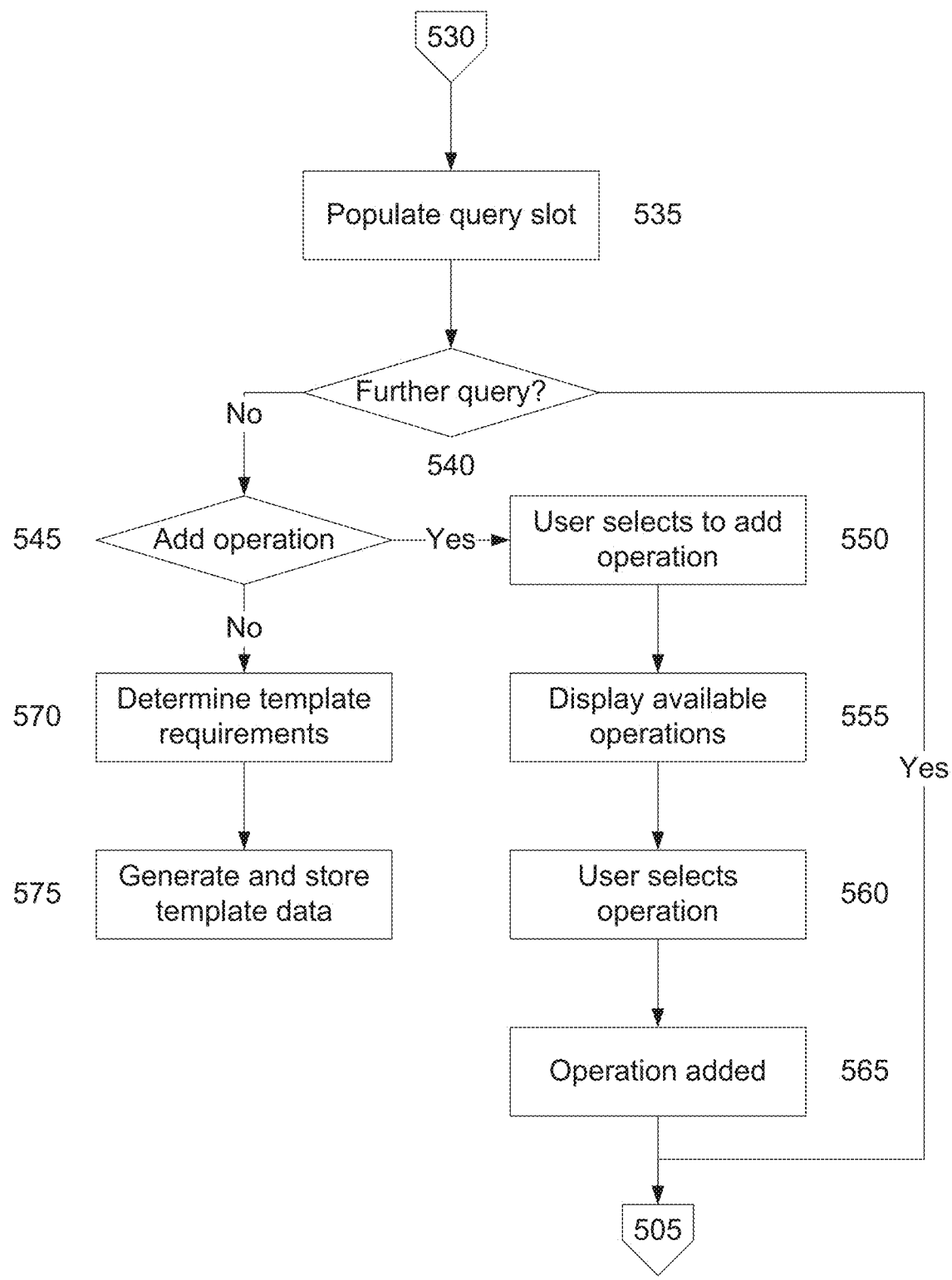

An example of a process for generating a template will now be described in more detail with reference to FIGS. 5A to 5C.

In this example, at step 500, the user launches a template editor. The template editor may be hosted locally on the computer system 230 or remotely on a server 210, and accessed by the computer system 230. In either case, the user operates to select to edit or create a new template at step 505.

In the event that the user selects to edit an existing template, the user is typically presented with a search facility, allowing the user to browse and retrieve templates stored in a local or remote template database. The selected template would then be displayed to the user allowing the user to edit the template as required.

Figure 5C:
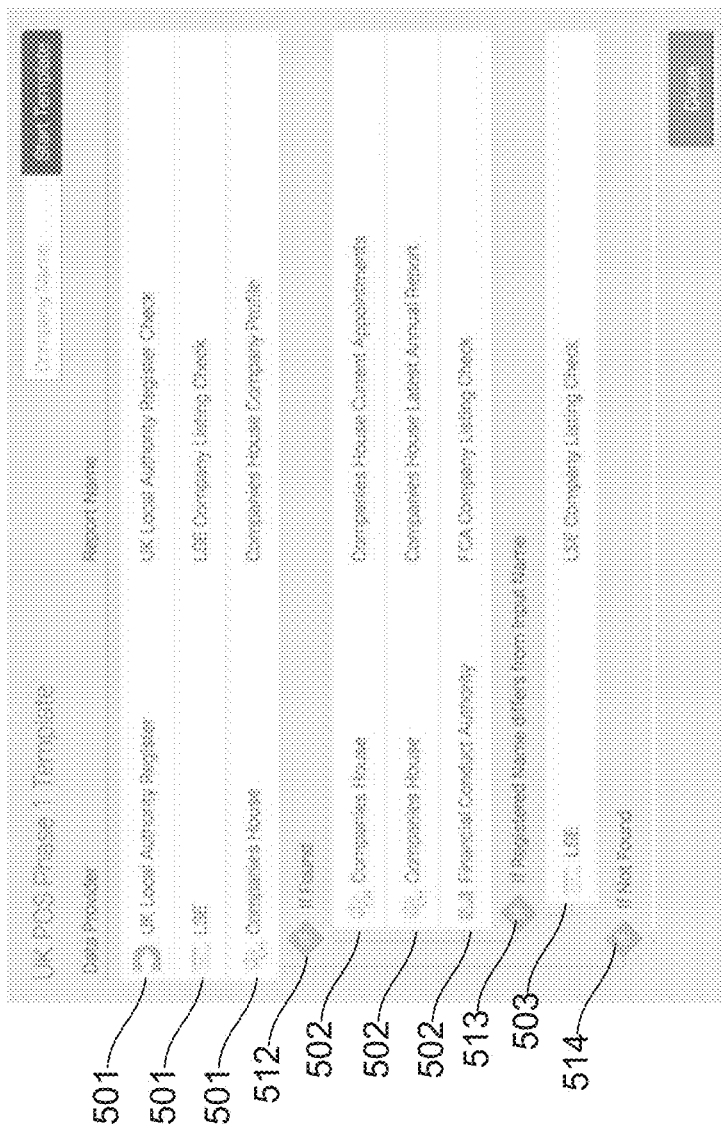
FIG. 5C is a schematic diagram of an example of a template displayed by a template editor.

An example template is shown in FIG. 5C. This template is an example of a template that is used to retrieve information regarding a company based on a supplied company name.

In this example, the template includes a number of queries 501, 502, 503 and operations 512, 513, 514. Each of the queries 501, 502, 503 specifies a data source name and a report name, which indicate the data source to which the query is applied, and the report that is requested using the query. Each operation 512, 513, 514 includes a name or brief description indicating the nature of the operation.

In this example, each query 501, 502, 503 is shown in a respective row in a table, which is hereinafter referred to as a query slot. The queries 501, 502, 503 are arranged hierarchically, with the queries 501, 502, 503 being provided in respective first, second and third levels, and with operations 512, 513 separating the first and second and second and third levels respectively.

In one example, each of the queries in a given level of the hierarchy can be executed simultaneously or in turn depending on the preferred implementation. However, queries in the later levels can only be executed once queries in the higher levels are completed, optionally depending on the outcome of the first queries. Thus, in this example, the queries 501 are executed first, with queries 502, 503 being selectively executed depending on the results to the queries 501. Typically the queries 501 will use the company name as a query parameter, whilst the subsequent queries 502, 503 may use results of the queries 501 as query parameters.

In this regard, the operation 512 is a conditional operation corresponding to an "if" statement. Thus, the queries 502 are only performed if requirements associated with the "if" statement are met, in this case that a company having the specified company name is found. Another example is shown in the operation 513, which has an "if" statement that corresponds to a query being performed if a registered name identified by one of the queries 501 differs to an input name, such as the originally provided company name.

It will be appreciated that in the example shown, a further operation 514 is shown which could be associated with respective queries (not shown). This operation can define an alternative second level in the hierarchy, which will again be optionally executed depending on the outcome of queries 501 in the first level. In particular, in this example, the operation 514 is an "if" statement that results in queries being executed if a company is not found. Thus, this represents an alternative to the queries 502, although it will be appreciated that this is not essential, and any arrangement of operations and queries could be used, thereby allowing complex decision making behaviours to be embodied within the template.

Alternatively, if the user has selected to create a new template, a blank table can be shown with one or more blank query slots displayed therein.

The user then selects a query slot to edit at step 510, causing the computer system 230 to display a list of available data sources at step 515. The list of available data sources can be retrieved from a local or remote source database, which specifies different data sources for which queries have been defined. The list of available data sources can optionally be searched and/or filtered based on information, such as the entity type, or available attributes of the entity to which the search relates. For example, if the entity is a company, then data sources specific to company information can be displayed.

The user selects a data source at step 520, causing the computer system 230 to display a list of available report types for the respective data source. Again, this information can be retrieved from a local or remote report database, which includes details of the different reports that can be obtained from each data source. It will be appreciated that the source and report databases could be part of a single combined database, but this is not essential, and for example details of available reports may be obtained directly from a selected data source.

At step 530, the user selects a report type, with this information being used to retrieve a query instruction and populate the respective query slot at step 535. In this regard, the computer system 230 uses the selected report to retrieve a query instruction from a query database, which typically specifies the information required to perform the query, and optionally a location of a script or rules required to construct the query.

At this stage, it is determined if a further query is to be added at step 540, in which case the process can return to step 505, with the above described steps being repeated as required, for example until all queries within a current level of the hierarchy are defined.

Otherwise, at step 545 the user decides if they wish to add an operation. In which case, the user selects to add an operation at step 550, which creates an operation slot. Available operations are then displayed by the computer system 230 at step 555, allowing the user to select an operation at step 560, with this being added at step 565. This process will typically involve having the user associate the operation with an outcome of a previous query, for example by specifying behaviour based on a particular result, such as a positive or negative result for a previous query. Once the operation is defined, a new query slot can be automatically generated. In this regard, as an operation will generally be followed by a query, selection of an operation can automatically trigger creation of a corresponding query slot, with the process of step 505 onwards being repeated to allow a further query to be created.

If no operation is to be added and no further queries to be added, at step 570 template requirements can be determined. This typically examines the queries to determine the query parameters required in order for the search to be successfully executed. Thus for the template of FIG. 5C, the only requirement is a company name, but it will be appreciated that other templates may have multiple different requirements associated with different ones of the queries. Finally, the computer system can generate template data, which is then stored in a template database at step 580, allowing the template to be subsequently retrieved and used as required.

Figure 6:
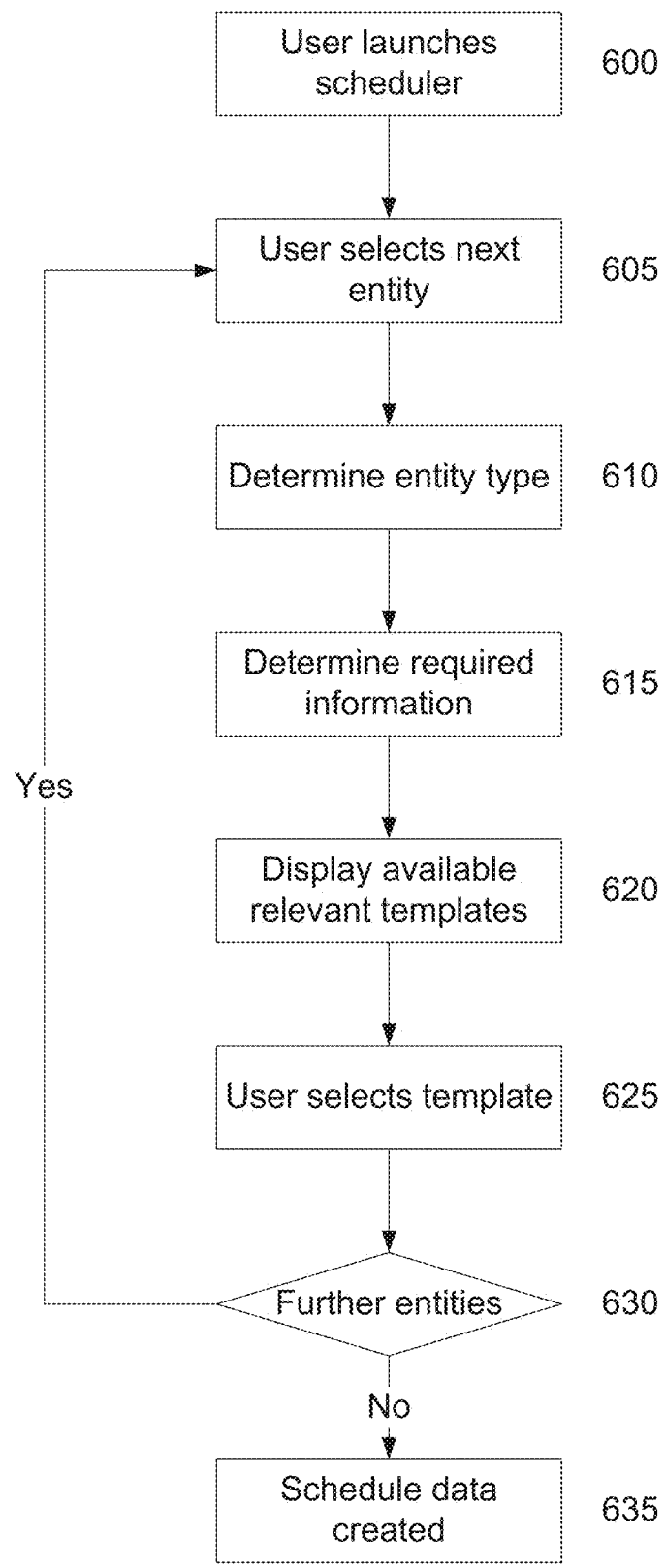
FIG. 6 is a flow chart of an example of a process for creating a schedule for performing searches relating to a plurality of entities.

An example of the process for creating a schedule will now be described with reference to FIG. 6.

In this regard, a schedule is intended to refer to a list of entities and associated templates that can be used in order to allow a number of different entities to be searched automatically by the computer system 230 and/or server 210. The schedule can be executed on a one off basis, or could alternatively be performed repeatedly allowing information regarding entities to be updated. However, it will also be appreciated that reference to a schedule is not intended to be limiting, and the searching process could be implemented using any indication of one or more entities and associated templates.

In this example, at step 600 the user launches a scheduler application using the computer system 230, to allow a schedule to be created. The scheduler application displays a user interface allowing the user to select an entity at step 605. This can be achieved by allowing the user to search for defined entities, for example by searching a local or remote entity database, or simply by having the user provide information regarding an attribute of the entity, such as an entity name, identifier or the like.

In this example, at step 610 an entity type associated with the selected entity is determined. This can be achieved in any appropriate manner, such as by having the computer system 230 or server 210 determine this based on the selected entity, either based on the attribute of the entity provided in step 605, by retrieving this information from the entity database, or by having the user specify the entity type. In this latter case, a list of available entity types can be provided on the scheduler interface, simply allowing the user to select a relevant one of these.

Similarly, at step 615 an indication of required information regarding the entity is determined, typically by having the user provide an indication of this, for example selecting an option from a list. Thus, for example, the user could indicate that they require information regarding a company structure, identity of individuals involved in a company or the like.

At step 620, available relevant templates are selected by the computer system 230 or server 210, optionally based on the entity type and/or required information, before being displayed to the user to allow the user to select one of the templates at step 625. Thus, it will be appreciated that relevant templates are determined by filtering a list of all available templates based on the entity type of the respective entity and/or the required information, so that a list of templates which can be used for the respective entity are shown to the user, allowing the user to select a relevant template.

Once this has been performed, it is determined if further entities are to be added to the schedule at step 630, and if so, the process returns to step 605. Otherwise, schedule data is created at step 635. As part of this final step, the user can specify information regarding when the schedule should be executed, for example if this should be performed on a periodic as opposed to a one off basis.

Accordingly, the above described process creates a schedule including a number of entities and associated templates, defining searches that can be executed in order to determine information regarding each of the entities.

Figure 7A:
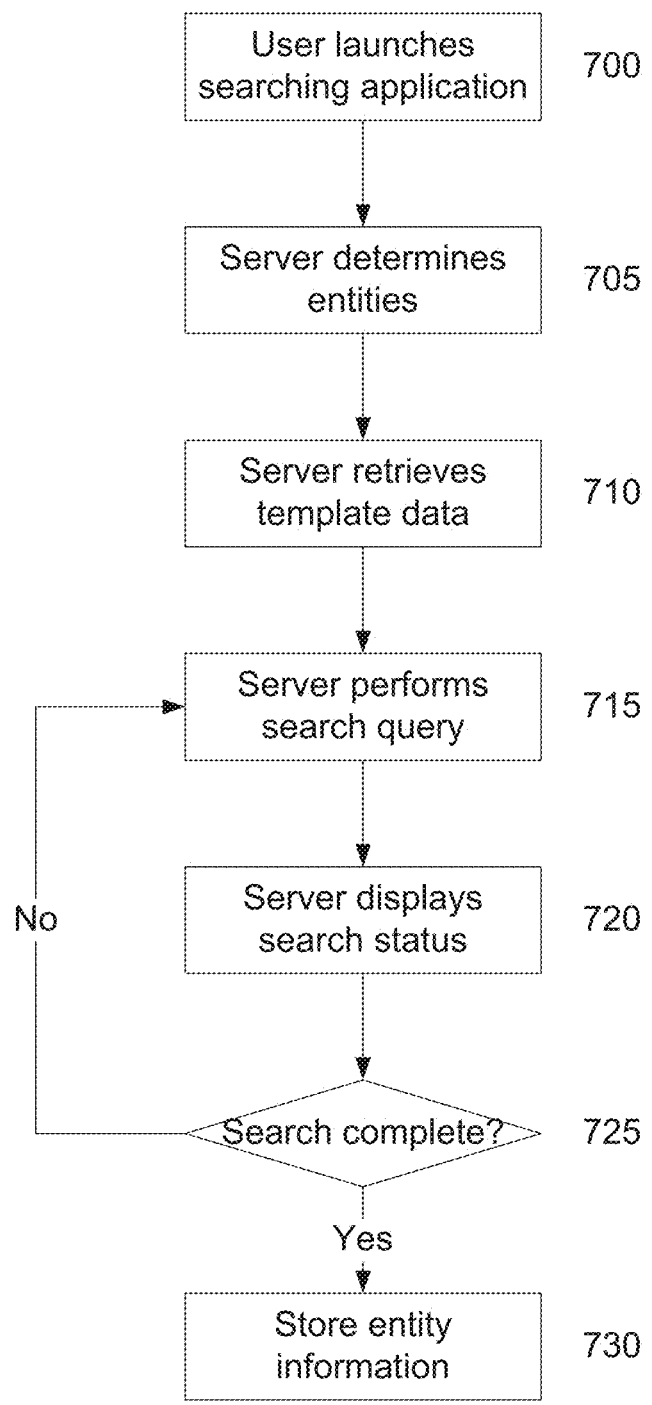
FIG. 7A is a flow chart of an example of a process for performing searches relating to a plurality of entities.

An example of the process for performing searches relating to a plurality of entities will now be described with reference to FIG. 7A and FIG. 7B. It will be appreciated from the following description that this can be performed using a schedule, or alternatively could be performed using any indication of entities and associated templates, so references to use of a schedule are not intended to be limiting.

In this example, at step 700 a user launches a searching application hosted either locally on the computer system 230 or a server 210. At step 705 the computer system 230 and/or server 210 determines the entities to be searches. This can be achieved by having the user enter details of these manually, or could be performed by retrieving the details from a schedule. In one example, this process is triggered automatically in accordance with execution requirements associated with the schedule.

At step 710, the computer system 320 and/or server 210 determines template data for respective templates associated with each of the entities. It will be appreciate that this can be performed in any manner, such as by identifying templates from the schedule and retrieving respective template data from a template database. Alternatively, this could be achieved by having the user provide an indication of the templates to be used manually.

At step 715, the computer system 230 and/or server 210 commences executing queries for each of the templates. An example of the process for executing the queries will be described in more detail with reference to FIG. 8A and FIG. 8B.

Figure 7B:
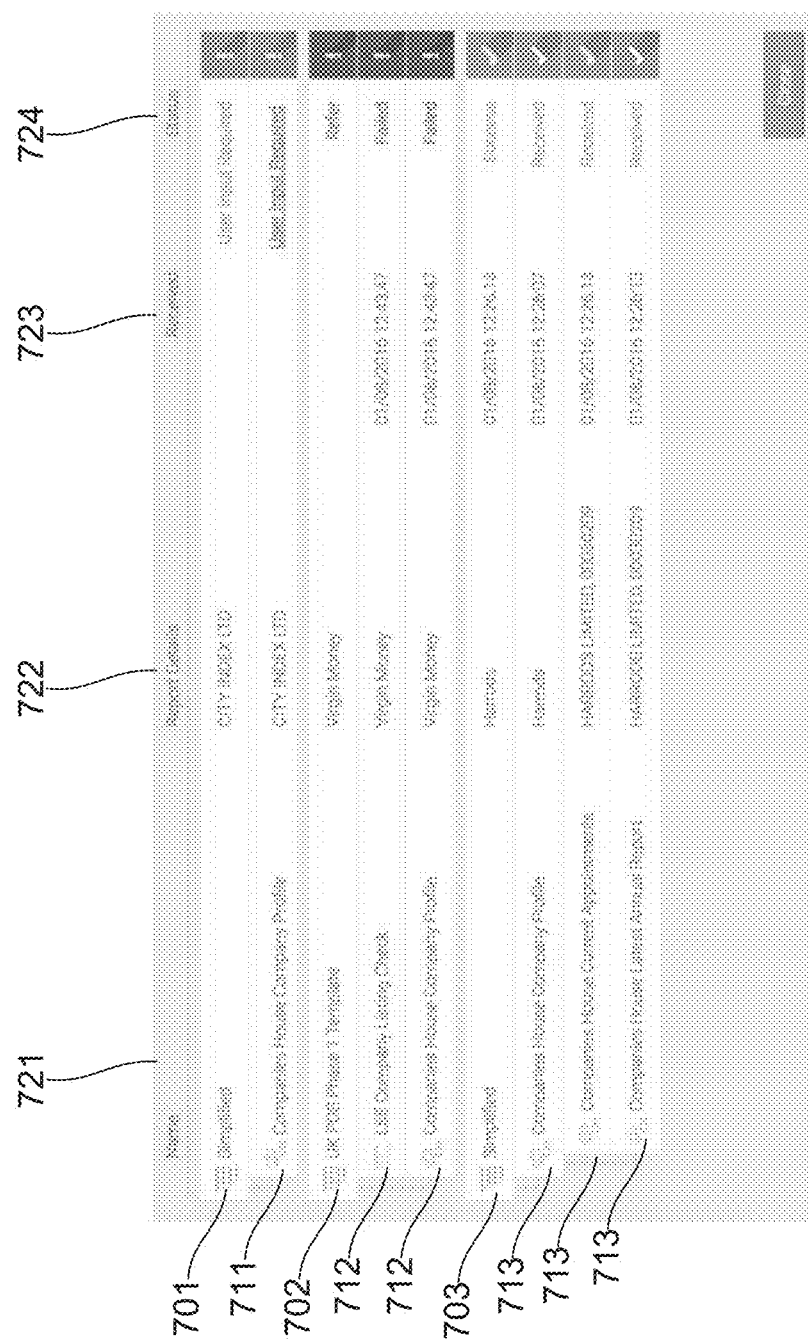
FIG. 7B is a schematic diagram of an example of a user interface showing the status of searches relating to a plurality of entities.

At step 720 an associated search status is displayed as the queries are executed and an example of this is shown in FIG. 7B. In this example, a status screen is provided including a table having columns corresponding to a query name 721, report name 722, query received 723 and status 724. A number of rows are provided, with the rows being indicative of the status of respective templates 701, 702, 703 and the status of the individual queries 711, 712, 713 for each template. The status indicates if the template and/or query has been executed successfully, or if this has failed and why this might be the case. For example, in this instance the query 711 requires user input in order to be completed, and hence the template 701 has not been completed. In the case of the template 702, the query 712 has failed and the template cannot therefore be completed and this must be referred for further input. In contrast, the template 703 has been completed as each of the queries within the template have been successfully executed.

Following this, it is determined if the search is completed at step 725, and if not the process returns to step 715 with further queries being executed and a corresponding updated status being displayed. Thus, it will be appreciated that the status screen is continually updated as queries are executed, thereby providing a user with an overview of the status of each of the templates and queries, and facilitating the user providing input should this be required, as will be described in more detail below.

Once a template and hence search is completed, entity information can be stored at step 730. In this regard, information for each entity is typically stored as part of a respective workspace, and may integrated into existing information, for example to update the existing information.

Accordingly, the above described arrangement provides a mechanism to allow a single user to oversee a number of searches running in parallel, and provide input to the searches as required.

Figure 8A:
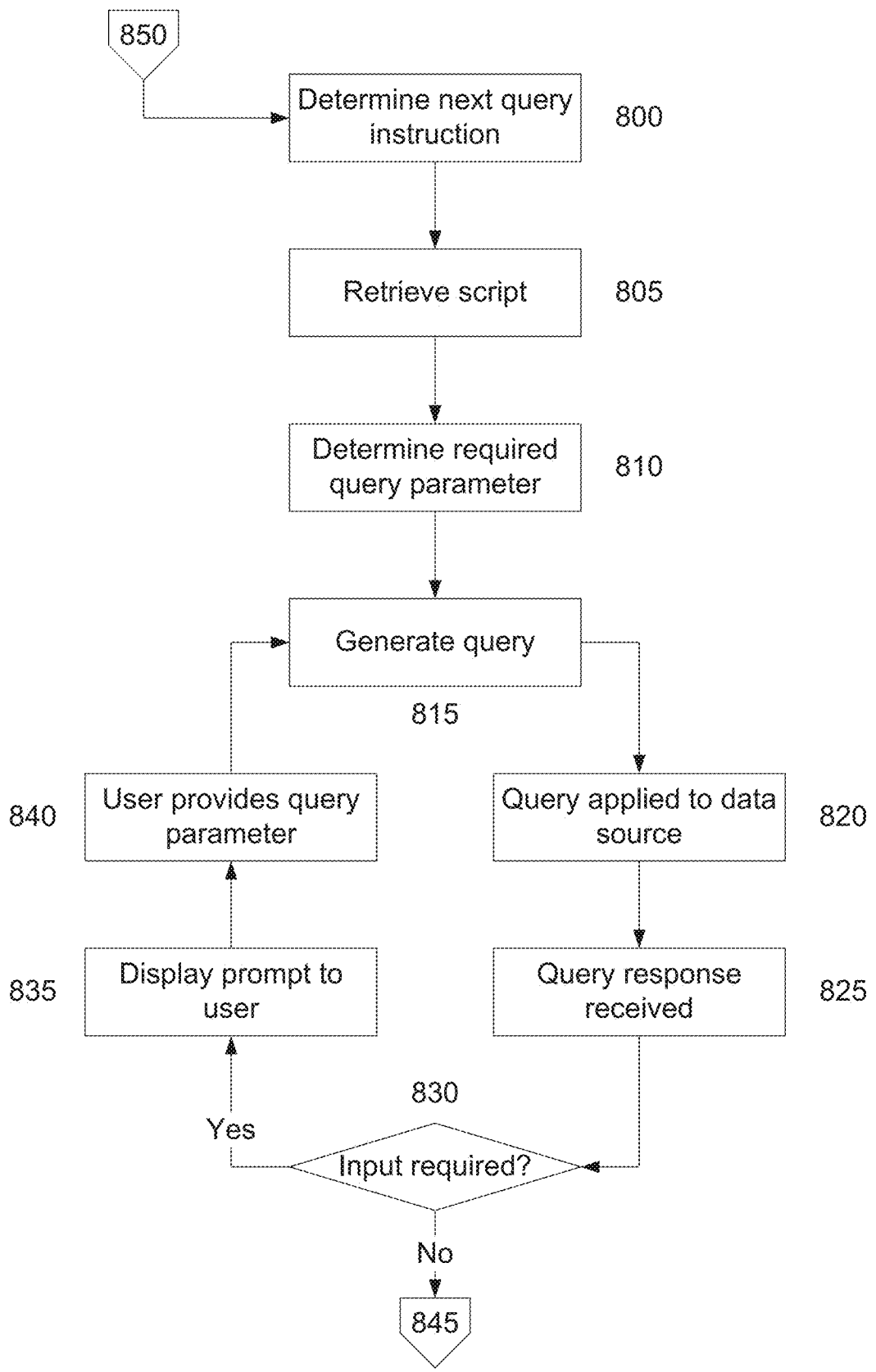
FIG. 8A and FIG. 8B are a flow chart of a specific example of a process for performing a search relating to a respective entity.
Figure 8B:
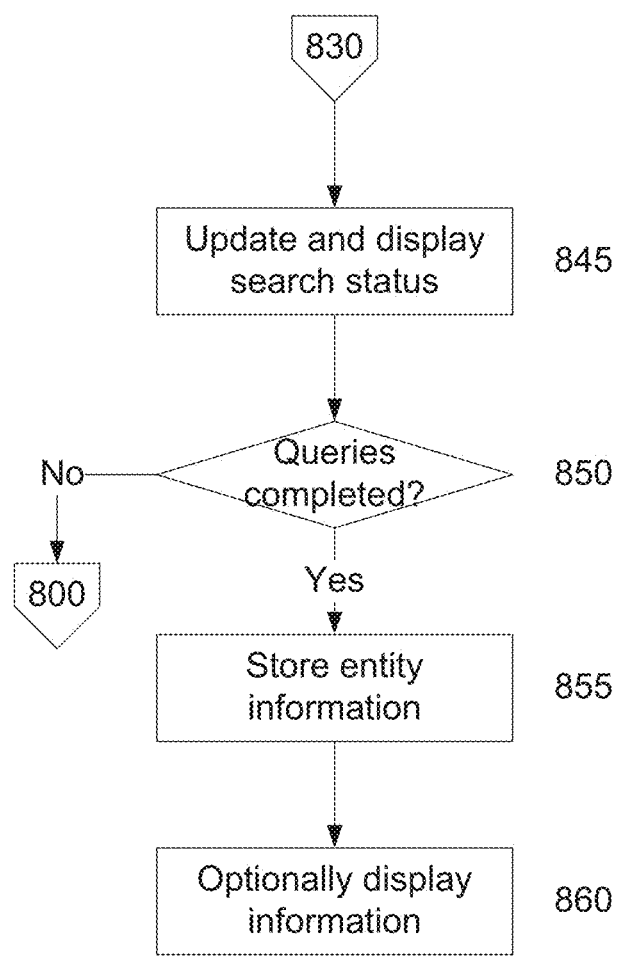

An example of the process for performing an individual search will now be described with reference to FIG. 8A and FIG. 8B.

In this example, it will be assumed that the search is being performed as part of the process described above with respect to FIG. 7A and FIG. 7B and that as part of this process, the computer system 230 and/or server 210 has determined the entity to be searched and retrieved the relevant template. However, it will be appreciated that this is not essential, and the search could be triggered in any appropriate manner, such as by having a user indicate that a search of a specified entity is to be performed based on a specified template.

In this example, the computer system 230 and/or server 210 determine a next query instruction in the template at step 800. Thus, the computer system 230 and/or server 210 will simply parse the template and select the next query to be implemented. In this regard, as previously described a number of queries can be implemented simultaneously, in which case the following steps will be repeated for each query in parallel.

At step 805 the computer system 230 and/or server 210 retrieves a script associated with the query, from a script database or the like. The script typically specifies any required query parameters, with these being determined by the computer system 230 and/or server 210 at step 810.

The nature of the query parameters and the manner in which these are determined will vary depending on the circumstances. For example, the query parameters could be attributes of the entity, such as an entity name or other identifier that are supplied by a user when creating a schedule or specifying the searches to be performed. Alternatively, the query parameters could be determined based on the results of previously performed queries, in which case previous query results are parsed and the relevant parameters extracted therefrom.

As a further alternative, there could be need for a user to enter a value for the query parameter. In general if the template is well formed, this should not be required as a default position, and will typically only be required depending on the outcome of an attempt to perform the query, as will be described in more detail below.

At step 815, the computer system 230 and/or server 210 generates the query, which can then be applied to a data source at step 820. The data source could include local data, stored either by the computer system 230 and/or server 210, depending on the preferred implementation. Additionally and/or alternatively the data source could be a remote server 210, with the query being applied to the data source via a suitable interface, such as an API (Application Programming Interface) or the like.

Figure 8C:
FIG. 8C is a schematic diagram of an example of a user interface for selecting an entity; and, FIG. 8D is a schematic diagram of an example of a network representation.

A response is received from the data source at step 825, with the computer system 230 and/or server 210 determining from the response whether additional user input is required at step 830. For example, if the query involves performing a search based on an entity name, the name supplied by the user may return a number of potential matches, in which case it is necessary for the user to select which match(es) are correct. If so, the computer system 230 and/or server 210 generates a prompt which is displayed to the user, requesting the additional information. Thus, for example, the user could be presented with the indication that user input is required as shown for the query 711 in FIG. 7C. In this example, the status indication is in the form of a link, and when the user selects the link, the user can be presented with a suitable input screen, such as the screen shown in FIG. 8C, which allows the user to select one of a number of potential matching entities.

Thus, the user selects an appropriate input option, providing a relevant search parameter value at step 840, with the process returning to step 815 allowing the server to generate a query based on the provided parameter, which is then applied to the data source. This process can be repeated as required until input is no longer required, at which point the query is successfully executed. Upon successful execution, the computer system 230 and/or server 210 updates the status screen, which is displayed to the user at step 845.

At step 850 the computer system 230 and/or server 210 determines if further queries are to be performed. It will be appreciated that in one example, this simply involves determining if there are further queries in the template that have not yet been executed. However, this can also involve examining operations within the template and determining if further queries are to be performed based on the logic defined by the operation. For example, if an operation requires that further queries are performed if a result from a previous query meets certain criteria, the computer system 230 and/or server 210 will examine the results of the previous query and determine whether further queries are to be implemented.

If so the process returns to step 800, otherwise information is generated from the results and stored at step 855. In this regard, the information may form all or part of the results, and may be determined by analysing the results, for example to transform the results into a different format, extract information therefrom or the like. In this regard, information may be stored as records in an internal XML file format with the search results being presented as a report in a standard format such as a PDF, in which case received results may be converted to an XML file format by parsing the PDF and extracting text therefrom. The original PDF report is also typically stored for reference purposes.

At step 735, the user can then optionally select to create a network representation, which can then be displayed to the user. As part of this process, the computer system 230 and/or server 210 automatically extracts all entities within the search results allowing these to be used in generating the network representation.

Figure 8D:
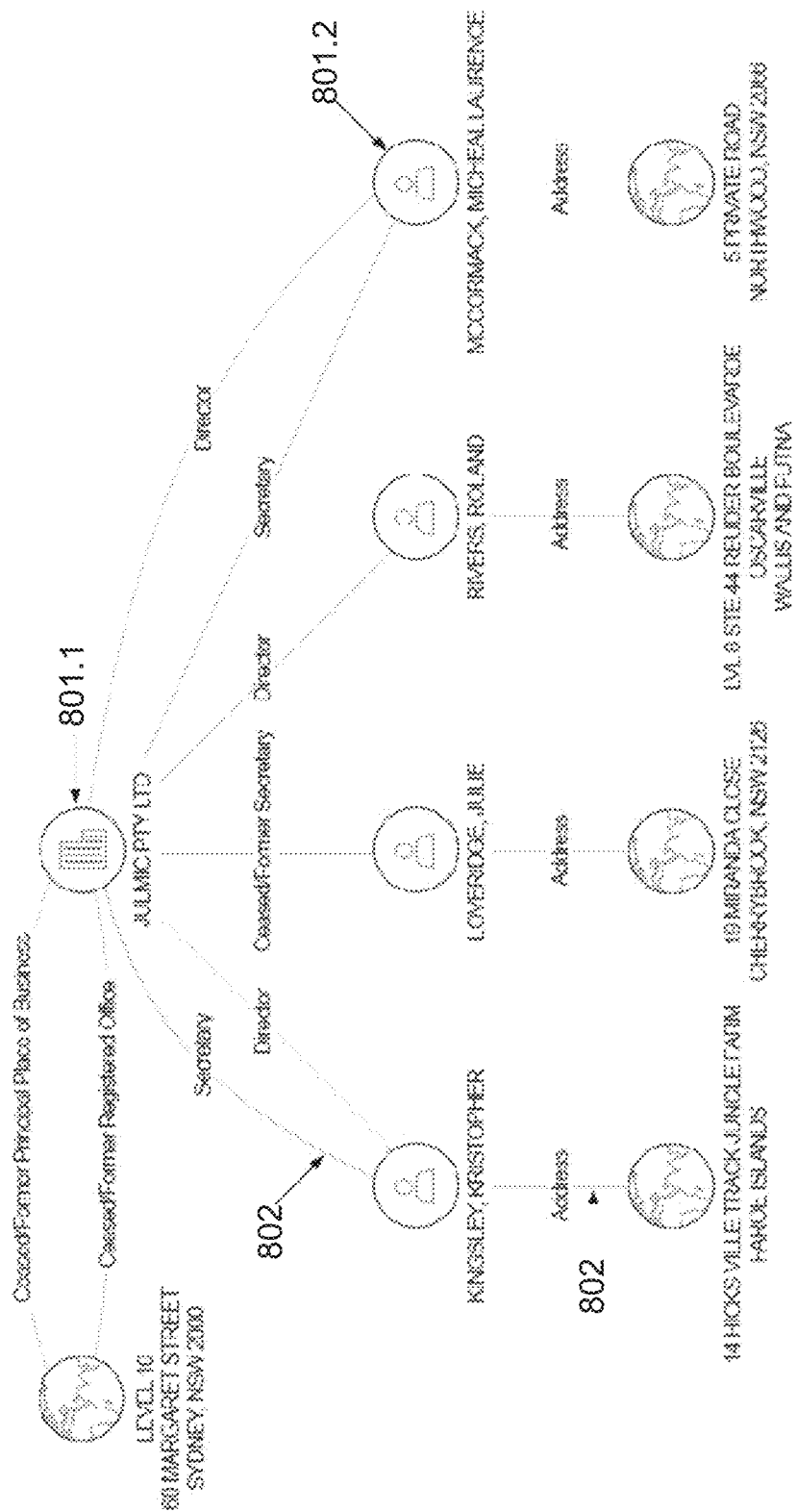

An example network representation is shown in FIG. 8D. In this example, the network representation typically includes a number of nodes 801.1, 801.2, with each node being indicative of a corresponding entity, and a number of connections 802 between nodes, with the connections being indicative of relationships between the entities.

The network representation may be generated in any appropriate manner, but in one example this is achieved by having the computer system 230 and/or server 210 ascertain information regarding entities and their relationships from the search results, and then executing a predetermined procedure for generating the network representation.

If this is a new representation, the entity that is the focus of the search is displayed as a primary node 801.1, together with any other associated entities 801.2 determined based on the data record, such as ownership, address, associated entities or persons, or the like, and corresponding relationships 802. If this is an existing network representation that is being extended, then the entities returned by the current search are checked against those in the chart already and it is determined if these are the same, in which case they are merged together.

Once created, the user can interact with the network representation. As part of this, the computer system 230 and/or server 210 will detect the interaction, for example, by receiving indications of user input commands, and use this to assess whether the user is manipulating the representation or performing another action, such as requesting an additional search.

If the user is manipulating the representation, this can simply be redrawn as required, otherwise, the system can operate to perform an additional search. In one example, the user can select one of the entities shown on the representation and then trigger a search on the basis of that entity, for example by selecting a respective template and allowing a search to be performed using that template in a manner similar to that outlined above.

Accordingly, it will be appreciated that the above described system allows users to perform searches of entities by using templates defining a sequence of queries. The templates can be executed automatically, or semi-automatically by prompting a user to enter required information. This vastly reduces the burden on the user in overseeing the search, allowing searches to be performed more rapidly and hence in a more cost effective manner.

Additionally, the above described arrangement provides a mechanism to allow the user to generate templates. In one example, this is performed via a graphical user interface, allowing a user to define combinations of queries, allowing a user to define a range of different templates meeting particular search requirements. This enables a high degree of flexibility to be maintained, whilst allowing this to be achieved by users with little or no knowledge regarding coding or the like.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

Persons skilled in the art will appreciate that numerous variations and modifications will become apparent. All such variations and modifications which become apparent to persons skilled in the art, should be considered to fall within the spirit and scope that the invention broadly appearing before described.

The invention claimed is:

1. A system of retrieving information relating to an entity, the system including, at least one electronic processing device that performs a search by:
   a) determining a respective search template for the entity, the search template being indicative of a sequence of query instructions;
   b) performing a sequence of queries in accordance with the sequence of query instructions of the respective search template, each query being a query of a data source performed in accordance with a respective query instruction and being performed at least in part using at least one of:
      i) an identity of the respective entity; and,
      ii) a result of a previous query performed in accordance with a previous query instruction in the sequence of query instructions;
   c) determining a result for at least some of the sequence of queries; and,
   d) determining information relating to the entity using the results, wherein the at least one processing device performs the search for at least some of the queries by:
      i) performing a previous query in accordance with the sequence of query instructions;
      ii) determining a result for the previous query; and, iii) at least one of:
(1) selecting a next query to be performed from the sequence of query instructions at least partially in accordance with the results for the previous query; and,
(2) performing a next query from the sequence of query instructions at least partially in accordance with the result for the previous query by:
(a) determining a query parameter from the result for the previous query, the query parameter being based on an attribute of the respective entity and the attribute including at least one of:
(i) an entity name;
(ii) an entity address;
(iii) an entity identifier; and,
(iv) an entity date of birth/creation; and,
(b) performing the query at least in part using the query parameter.

2. A system according to claim 1, wherein the at least one processing device performs searches for multiple different entities in parallel and performs at least some of the queries for a respective entity:
a) in turn; and,
b) in parallel.

3. A system according to claim 1, wherein the at least one processing device, for each query:
a) determines if user intervention is required depending on a query response; and,
b) if user intervention is required:
i) determines required query parameters in accordance with the query response;
ii) causes an intervention indication to be displayed to a user, the intervention indication being generated at least partially in accordance with the required query parameters;
iii) determines required query parameters in accordance with user input commands provided in response to the intervention indication; and,
iv) performs the query at least partially in accordance with the user input commands.

4. A system according to claim 3, wherein the at least one processing device transforms results from the query response into a summary list showing a list of potentially relevant entities allowing the user to select an entity from the summary list.

5. A system according to claim 1, wherein the at least one processing device:
a) retrieves a search schedule, the schedule defining:
i) a plurality of entities; and,
ii) a search template for each of the plurality of entities; and,
b) performs searches for each of the plurality of entities in parallel in accordance with the search schedule.

6. A system according to claim 1, wherein the at least one processing device determines a search template for an entity by:
a) retrieving details of available templates from a template database; and
b) at least one of:
i) selecting a search template in accordance with at least one of:
(1) an available entity attribute of the entity;
(2) an entity type of the entity; and,
(3) required information regarding the entity; and,
ii) displaying an indication of the available search templates and determining a selection of a search template in accordance with user input commands.

7. A system according to claim 1, wherein the at least one processing device generates a search template by:
a) determining a number of selected queries in accordance with user input commands;
b) retrieving query instructions for each selected query;
c) defining a sequence for execution of the number of selected queries in accordance with user input commands; and,
d) generating a sequence of query instructions in accordance with the number of selected queries and the determined sequence.

8. A system according to claim 7, wherein the at least one processing device generates the search template by:
a) retrieving details of available queries from a query database;
b) displaying an indication of available queries; and,
c) determining selection of one or more of the available queries in accordance with user input commands.

9. A system according to claim 7, wherein the at least one processing device generates the search template by:
a) retrieving details of available data sources from a source database;
b) displaying an indication of one or more available data sources;
c) determining selection of a data source in accordance with user input commands; and,
d) displaying details of available queries at least partially in accordance with the selected data source.

10. A system according to claim 7, wherein the at least one processing device generates the search template by:
a) retrieving details of available reports for the selected data source from a report database;
b) displaying an indication of available reports;
c) determining selection of one or more of the available reports in accordance with user input commands; and,
d) displaying details of available queries at least partially in accordance with the selected report.

11. A system according to claim 7, wherein the at least one processing device generates the search template by:
a) determining at least one operation by:
i) retrieving details of available operations from an operations database;
ii) displaying an indication of one or more available operations; and,
iii) identifying selection of one or more available operations in accordance with user input commands; and,
b) defining the sequence at least partially in accordance with the at least one operation.

12. A system according to claim 7, wherein the at least one processing device generates the search template by:
a) displaying a template editor interface;
b) displaying an indication of available queries;
c) populating at least one query slot with a selected query in accordance with user input commands;
d) displaying at least one operation slot associated with at least one populated query slot;
e) displaying an indication of available operations;
f) populating the at least one operation slot with a selected operation in accordance with user input commands;
g) for each populated operation slot:
i) displaying at least one query slot;
ii) displaying an indication of available queries; and,
iii) populating each query slot with a selected query in accordance with user input commands.

13. A system according to claim 1, wherein the at least one processing device:

a) generates a network representation including a number of nodes, each node being indicative of a corresponding entity and a number of connections between nodes, the connections being indicative of relationships between the entities by:
   i) obtaining results of one or more queries; and,
   ii) automatically extracting information regarding entities and their relationships from the results; and,
   iii) executing a predetermined procedure for generating the network representation; and,
b) causes the network representation to be displayed to a user.

14. A system according to claim 1, wherein the at least one processing device:
   a) generates a query string which is transformed into a valid query structure for a respective data source utilizing a script associated with a selected report type for the respective data source; and,
   b) passes the query string to a search service of the data source to allow the search service to perform the query and return query results.

15. A method for retrieving information relating to an entity, the method including, in at least one electronic processing device, performing a search by:
   a) determining a respective search template for the entity, the search template being indicative of a sequence of query instructions;
   b) performing a sequence of queries in accordance with the sequence of query instructions of the respective search template, each query being a query of a data source performed in accordance with a respective query instruction and being performed at least in part using at least one of:
      i) an identity of the respective entity; and,
      ii) a result of a previous query performed in accordance with a previous query instruction in the sequence of query instructions;
   c) determining a result for at least some of the sequence of queries; and,
   d) determining information relating to the entity using the results, wherein the at least one electronic processing device performs the search for at least some of the queries by:
      i) performing a previous query in accordance with the sequence of query instructions;
      ii) determining a result for the previous query; and,
      iii) at least one of:
         (1) selecting a next query to be performed from the sequence of query instructions at least partially in accordance with the results for the previous query; and,
         (2) performing a next query from the sequence of query instructions at least partially in accordance with the result for the previous query by:
            (a) determining a query parameter from the result for the previous query, the query parameter being based on an attribute of the respective entity and the attribute including at least one of:
               (i) an entity name;
               (ii) an entity address;
               (iii) an entity identifier; and,
               (iv) an entity date of birth/creation; and,
            (b) performing the query at least in part using the query parameter.

* * * * *